United States Patent

Parrish

[11] Patent Number: 6,003,579
[45] Date of Patent: Dec. 21, 1999

[54] APPARATUS FOR BONDING A COVER MATERIAL TO FOAM

[75] Inventor: Kenneth R. Parrish, Detroit, Mich.

[73] Assignee: Lear Corporation, Southfield, Mich.

[21] Appl. No.: 08/788,432

[22] Filed: Jan. 28, 1997

Related U.S. Application Data

[63] Continuation-in-part of application No. 08/594,894, Mar. 25, 1996, Pat. No. 5,902,434.

[51] Int. Cl.$^6$ ................................ B32B 31/00; B65C 1/00
[52] U.S. Cl. .......................... 156/498; 156/497; 156/580; 156/475; 156/212
[58] Field of Search ..................................... 156/285, 212, 156/214, 308.2, 309.6, 245, 497, 498, 475, 580

[56] References Cited

U.S. PATENT DOCUMENTS

| | | |
|---|---|---|
| 4,692,199 | 9/1987 | Kozlowski et al. . |
| 4,795,517 | 1/1989 | Elliot et al. .............................. 156/221 |
| 5,176,777 | 1/1993 | Guilhem .................................. 156/245 |
| 5,372,668 | 12/1994 | Bracesco . |
| 5,755,901 | 5/1998 | Ormachea ................................ 156/64 |
| 5,792,291 | 8/1998 | Ormachea ................................ 156/64 |

*Primary Examiner*—Jeff H. Aftergut
*Assistant Examiner*—R. Hendrix
*Attorney, Agent, or Firm*—MacMillan, Sobanski & Todd, LLC

[57] ABSTRACT

A method and apparatus for bonding a cover (22) over an undulating surface of a foam cushion (10) by placing the cover, an adhesive layer (82) and the cushion on a tool (18), compressing the cushion with a compression plate (58) to force ambient temperature air from an interior thereof, piercing the cushion with a plurality of needles (44) extending through holes (60) in the compression plate, releasing the compression, heating compressed air and ejecting the heated air from the needles into the interior of the cushion to elevate the temperature of the cushion. The heat is transferred from the cushion (10) to melt the adhesive (82). The cushion (10) is again compressed by the compression plate (58) to force the heated air from the interior of the cushion and the compression is released to allow ambient temperature air to flow into the interior of the cushion to cure the adhesive (82) and bond the cover (22) to the cushion (10). The needles (44) are extracted from the cushion as the compression plate is held against the backside of the cushion to hold the cushion and the cover against the tool (18).

11 Claims, 5 Drawing Sheets

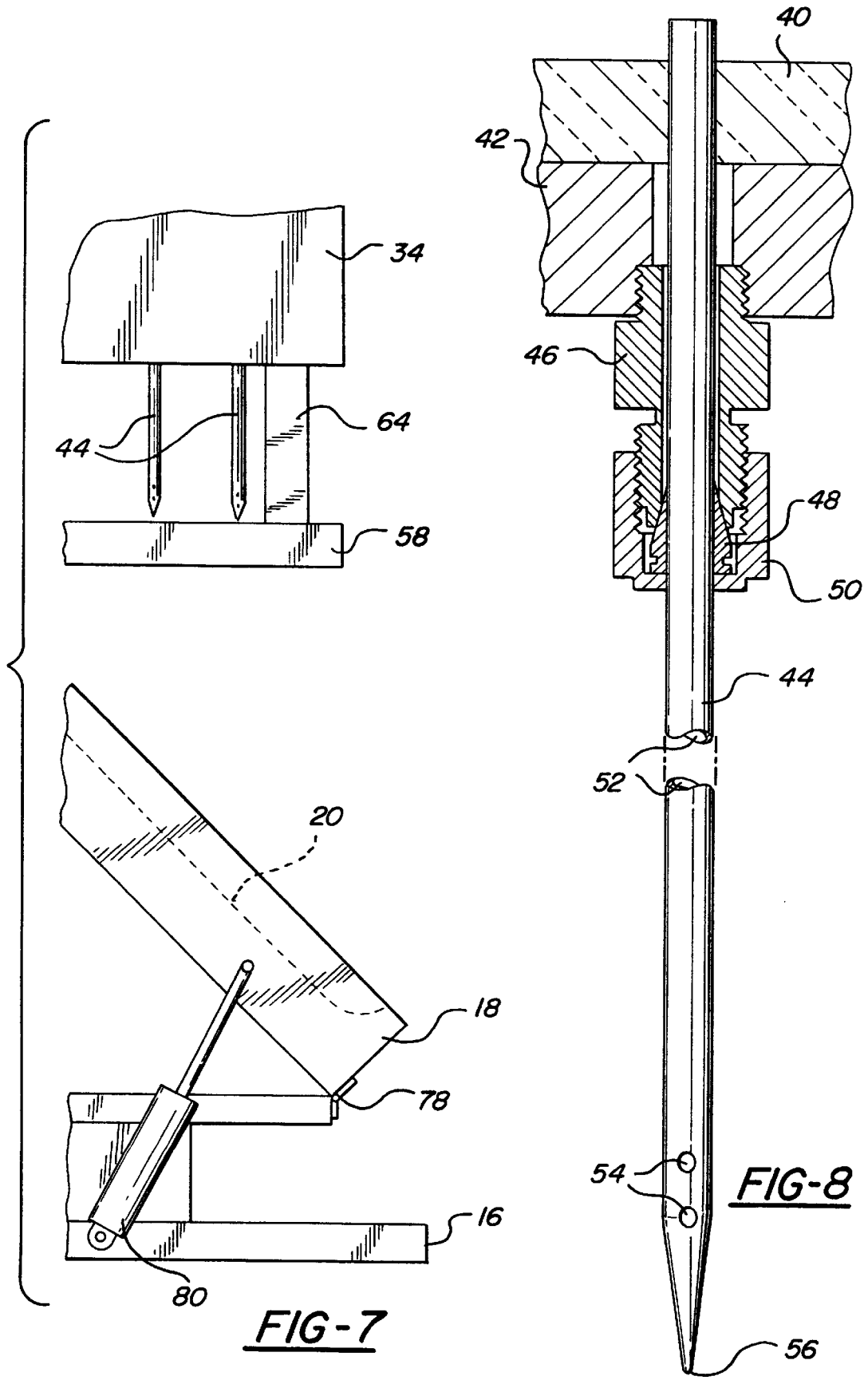

APPARATUS FOR BONDING A COVER MATERIAL TO FOAM

This is a continuation-in-part of application Ser. No. 08/594,894 filed on Mar. 25, 1996, now U.S. Pat. No. 5,902,434.

BACKGROUND OF THE INVENTION

The present invention relates to the bonding of a cover to a cushion or pad of the type utilized in automotive seats, armrests, and the like, the cushion being formed of a material such as cellular foam, polyester or cut foam.

A great deal of development activity has been expended to eliminate the labor intensive cut and sew methods of covering a foam cushion such as seat cushions in automotive seats. A particular segment of this development revolves around the bonding of the cover to the foam cushion.

One such method is disclosed in the U.S. Pat. No. 4,692,199 to Kozlowski et al. and assigned to the assignee of the subject invention. In accordance with the method disclosed therein, a vacuum is applied to the surface of a contoured tool or mold for drawing an impervious adhesive film against a cloth fabric layer to conform the cloth fabric layer to the contours of the tool surface. A foam cushion having a surface complementary to the tool is placed into mating engagement with the adhesive film as the film is held to the contour of the tool by the vacuum through the cloth layer. The foam cushion is held against the adhesive film, cloth layer and tool by a perforated platen and the vacuum is discontinued. Steam is then supplied through the tool to heat and melt the adhesive film for bonding the cloth layer to the foam cushion. A vacuum is then applied through the tool for removing moisture and curing the adhesive.

A modification of the above method is disclosed in the U.S. Pat. No. 5,372,668 to Bracesco wherein "the steam injection apparatus is associated with the upper mold rather than with the lower mold, . . . The upper mold is preferably provided with a plurality of cannulae which are able to pierce the foamed material constituting the padding body so as to provide a gripping action on the latter as well as the following injection of steam adjacent to the fabric." The lower mold or tool "has a greatly simplified structure" and merely applies a vacuum over the tool surface for drawing the cloth against the tool surface.

Although the known methods and apparatus are excellent for bonding a wide variety of cover materials to a foam cushion, there remain cover materials which can not be satisfactorily bonded to the foam cushion because their composition can not withstand the high temperatures and/or the moisture associated with these prior methods without unacceptable degradation.

SUMMARY OF THE INVENTION

The present invention concerns a method of bonding a cover layer of material over the surface of a foam cushion comprising the steps of: moving a tool from a working position beneath a plurality of needles to a loading position with a working surface of the tool facing generally forwardly; spreading a finished side of a cover over the working surface of the tool; placing an adhesive on a backside of the cover; applying a vacuum pressure over the working surface of the tool to draw the cover against the working surface of the tool; moving the tool from the loading position to the working position; placing a foam cushion on the working surface of the tool with a surface to be bonded to the cover on the adhesive; disposing a compression plate with holes extending therethrough on a backside of the cushion to compress the cushion and force air from an interior of the cushion; piercing the cushion with a plurality of needles extending through the holes in the compression plate to varying depths in the cushion; lifting the compression plate to remove the compression from the cushion; injecting heated air into the interior of the cushion through the needles to elevate a temperature of the cushion thereby melting the adhesive with the transfer of heat from the heated cushion; lowering the compression plate to compress the cushion and force the heated air from the interior of the cushion thereby cooling the cushion to cure the adhesive to thereby bond the cover to the cushion; lifting the compression plate to remove the compression from the cushion to allow ambient temperature air to flow into the interior of the cushion to cure the adhesive; and extracting the needles from the cushion while holding the compression plate against the backside of the cushion to hold the bonded cushion and cover against the tool as the needles are extracted. The method also includes heating ambient air to a temperature above the temperature of the cushion and supplying the heated air to the needles, and applying a vacuum pressure to the needles to draw the heated air from the interior of the cushion thereby cooling the cushion to cure the adhesive to thereby bond the cover to the cushion.

The present invention also concerns an apparatus for bonding according to the above described method comprising: a support structure; a tool supported by the support structure and having a working surface; a vacuum source connected to the tool for applying vacuum pressure over the working surface of the tool to draw the cover against the working surface; an array of needles movably supported by the support structure for piercing a foam cushion placed on the working surface; a compression plate having holes extending therethrough for receiving the needles extending through the holes, the compression plate being movably supported by the support structure for movement relative to the needles; and a plenum chamber having a wall, the needles extending through the wall and having bores therein for conveying heated air from the plenum to ejection ports in the needles for heating an interior of a cushion pierced by the needles, the vacuum source being connected to the plenum for subsequently drawing the heated air from the interior of the cushion.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7 is a fragmentary side elevation view showing the tool in a raised position for loading the cover and adhesive layers; and FIG. 8 is an enlarged view of a needle assembly utilized in the subject invention.

DESCRIPTION OF THE PREFERRED EMBODIMENT

Figure 1:
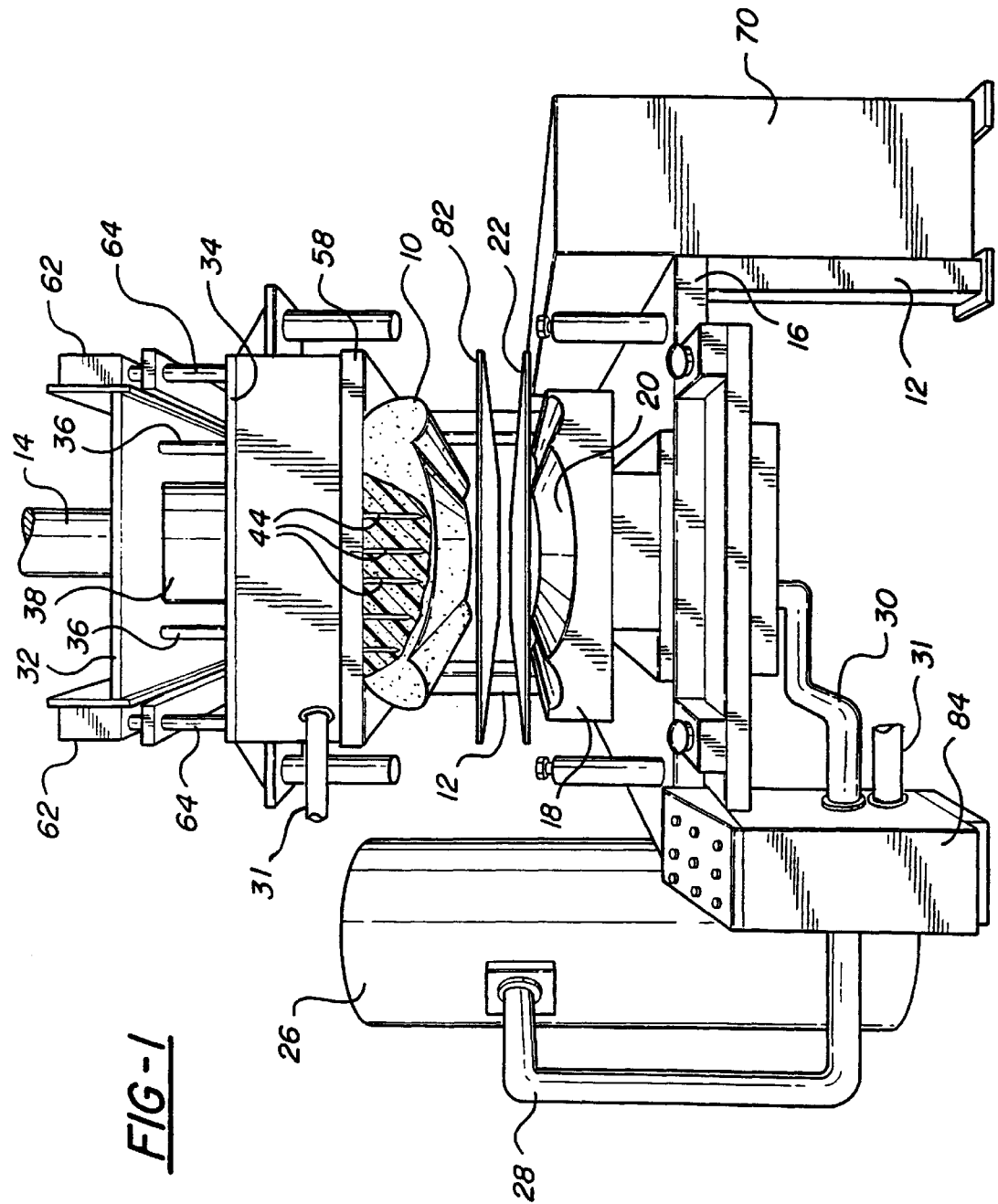
FIG. 1 is a perspective view of an embodiment of an assembly constructed in accordance with the subject invention and showing a foam cushion retained on the needles in spaced relationship to the tool and the film of adhesive and layer of cover in exploded relationship.

Referring to the Figures, wherein like numerals reference like or corresponding parts throughout the several views, an assembly for bonding a cover of material over the upper surface of a foam seat cushion 10 with an adhesive is generally shown in the FIG. 1. The assembly includes a support structure 12 for supporting a ram 14 and a base 16 of a press.

A tool or mold 18 is supported by the base 16 of the support structure 12 and presents an upper working surface 20 for receiving the finished side of a cover 22. The upper working surface 20 of the tool 18 includes passages or apertures for establishing fluid communication between the working surface and a hollow interior of the tool. The tool 18 defines an interior chamber 24 which is in fluid communication with a vacuum source 26 through a pair of lines 28 and 30. The tool 18 may also comprise a porous material through which fluids will flow.

The ram 14 is moved vertically by a pneumatic cylinder, or the like, to vertically position a horizontal support plate 32 attached to a lower end of the ram. A plenum chamber 34 is positioned below and is secured to the support plate 32 by tie rods 36 so that the plenum chamber is in a fixed spaced relationship to the support plate. A heater 38 is disposed between a top of the plenum 34 and a bottom of the plate 32 for heating compressed air and supplying the hot compressed air to the plenum. An insulating material 40 lines the interior walls of the plenum 34 to retain heat energy within the plenum, to minimize the transfer of heat energy to the surrounding environment.

The plenum 34 has a bottom wall 42 and an array of needles 44 extend through and are supported by the bottom wall. The needles 44 are, therefore, supported by the support structure 12 via the plenum 34, the tie rods 36, the support plate 32 and the ram 14. As shown in the FIG. 8, each needle 44 is adjustably supported through the bottom wall 42 by a coupling assembly which includes a fitting 46 threaded into a hole through the bottom wall with a conical collar 48 forced into radial gripping engagement with the needle body by a complementary tightening nut 50. The fitting 46, the collar 48 and the nut 50 comprise adjustment means for adjusting the distance each needle 44 extends from the bottom wall 42 of the plenum 34. Each of the needles 44 has a bore 52 formed therein for conveying heated fluid from the plenum 34 to injection ports 54 in the needles for heating the interior of the cushion 10. Each needle 44 also terminates in a lower pointed end 56 for piercing the cushion 10. The working surface 20 of the tool 18 undulates to complement the contour of the upper surface of the seat cushion 10 which is positioned upside down. Accordingly, the needles 44 extend various different distances from the bottom wall 42 whereby the lower pointed ends 56 of the needles are spaced substantially equal distances from the working surface 20 of the tool 18. All of the bores 52 in the needles 44 are of equal dimension and of equal length to equalize the various mass flow rates through all of the needles. In order to accomplish this feature, the needles 44 likewise extend into the plenum 34 various different distances. In this manner, equal amounts of heat are ejected from all of the needles 44 whereby the area of cushion 10 surrounding each needle is heated at the same rate and to the same degree as the areas surrounding all other needles.

The assembly is characterized by a compression plate 58 positioned below the plenum 34 and having holes or apertures 60 extending therethrough with each of the needles 44 extending through a corresponding one of the holes. A mounting mechanism comprising a pair of plate actuator cylinders 62 allows movement of the compression plate 58 relative to the needles 44 to hold the cushion 10 against the cover 22 and the tool 18 as the needles 44 are extracted from the cushion, as best illustrated in the FIG. 6. The actuators 62 are attached to opposite side edges of the support plate 32 and each has a pair of rods 64 extending downwardly through associated ones of a pair of guides 66 in the corners of the rectangular plenum 34. The rods 66 have lower ends attached to the compression plate 58 to support the compression plate under the bottom wall 42 for vertical movement relative to the plenum 34.

Figure 2:
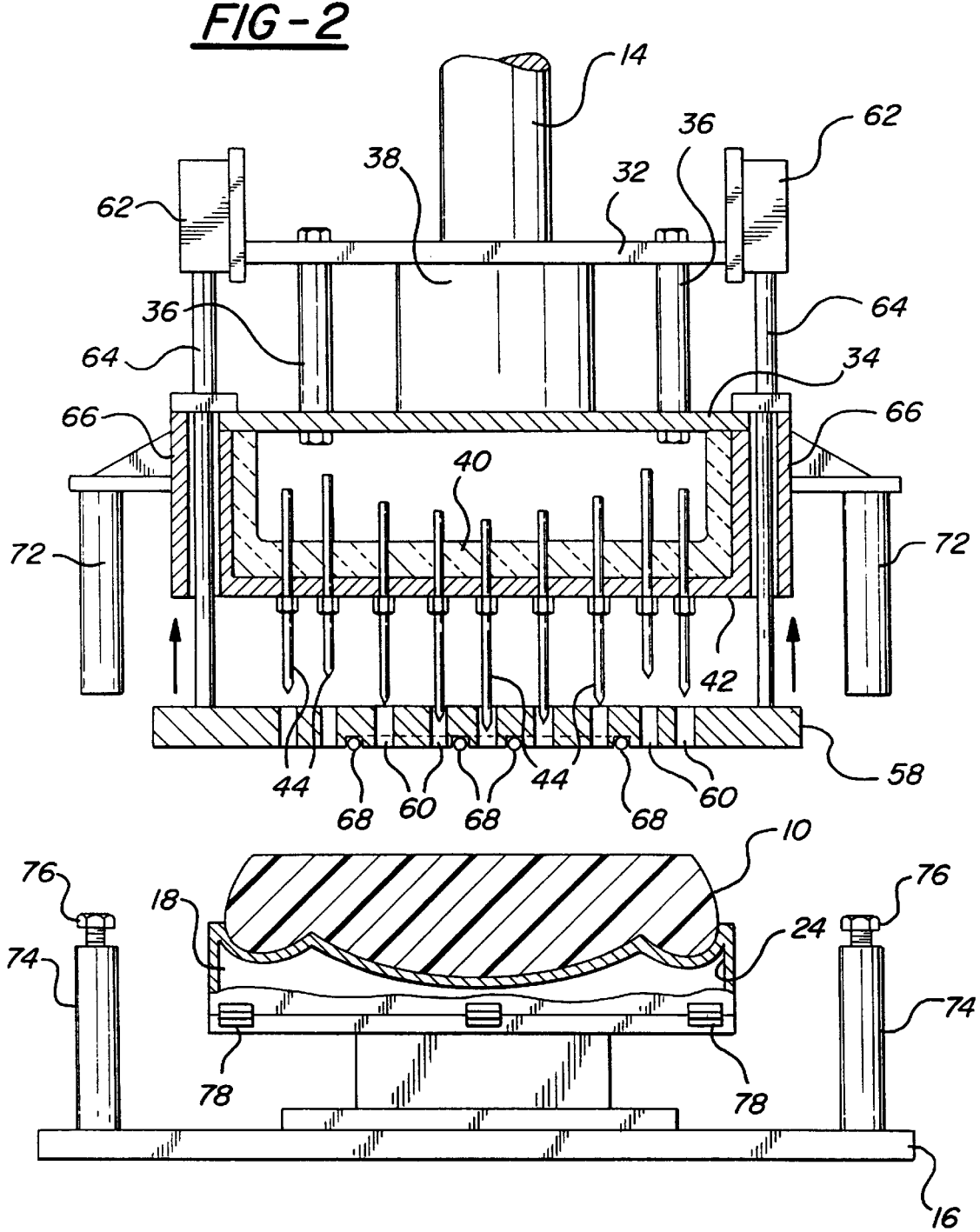
FIG. 2 is an elevation view partially in cross section showing a foam cushion on the tool and ready to be picked up by the needles.

As shown in the FIG. 2, the compression plate 58 includes a plurality of tubes 68 defining passages for injecting cool fluid into the backside of the cushion 10. An ambient air cooler 70 (shown in the FIG. 1) is in fluid communication with the passages 68 for supplying cool air to the passages in the compression plate 58. The air cooler 70 cools ambient or the surrounding air to supply relatively cold air to the compression plate 58.

A plurality of upper stops 72 depend downwardly from side walls of the plenum 34 and are aligned with corresponding lower stops 74 which extend upwardly from the base 16 for limiting downward movement of the ram 14 to prevent the needles 44 from engaging the working surface 20 of the tool 18. Each of the lower stops 74 is provided with an adjusting screw 76 to adjust the stop position. As an alternative, the adjusting screws 76 can be eliminated and the lower stops can be vertically adjustable relative to the base 16. The lower ends of the upper stops 72 can be tapered or pointed and the upper end of each of the lower stops 74 can have a concave recess formed therein with a central aperture for receiving the pointed upper stop. Thus, these alternative stops are self aligning to precisely position the plenum chamber 34 relative to the tool 18.

Figure 6:
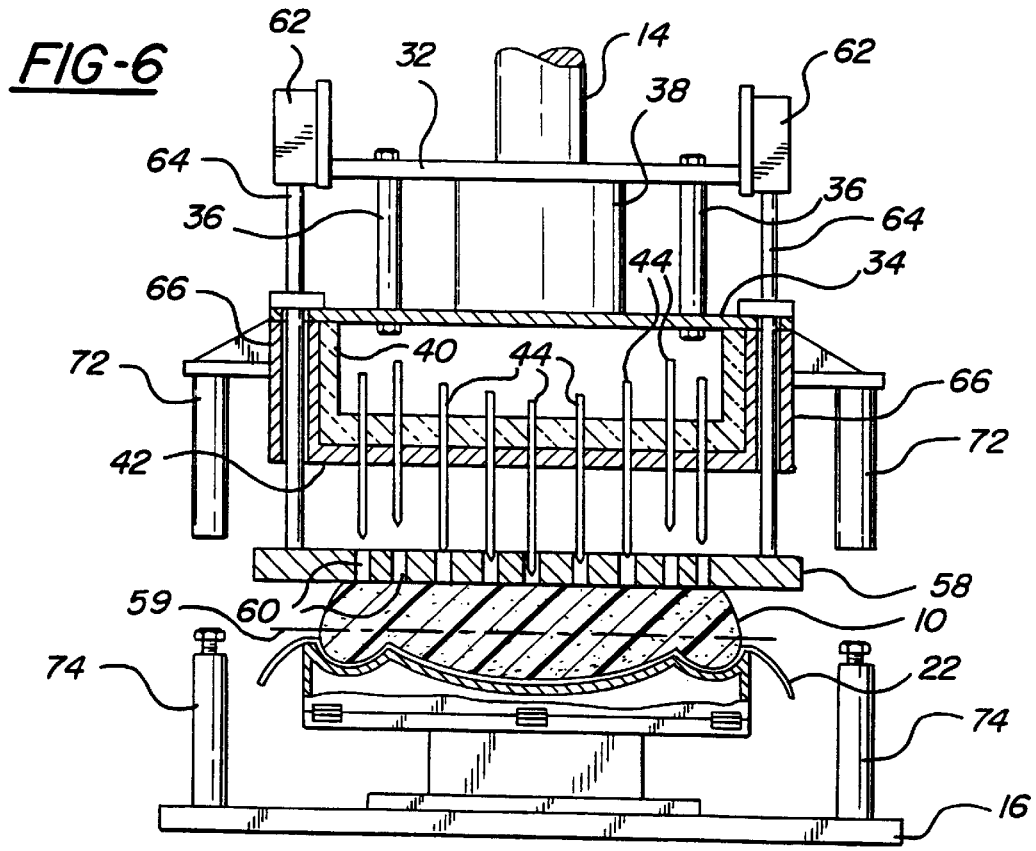
FIG. 6 is a similar view but showing the needles extracted from the cushion as the cushion is held to the tool by the compression plate.

A tool support is included for moving the tool 18 back and forth between a working position beneath the needles 44, shown in the FIG. 1 through the FIG. 6, and a loading position with the working surface 20 thereof facing generally forwardly, as shown in the FIG. 7. The tool support comprises a plurality of hinges 78 interconnecting the tool 18 and the base 16, and an actuator 80 connected between the tool and the base for tilting the tool upwardly to an inclined and forwardly facing position shown in the FIG. 7. In the alternative, the tool 18 can be fixed relative to the base 16 and the base can be hinged to the support structure 12.

Figure 3:
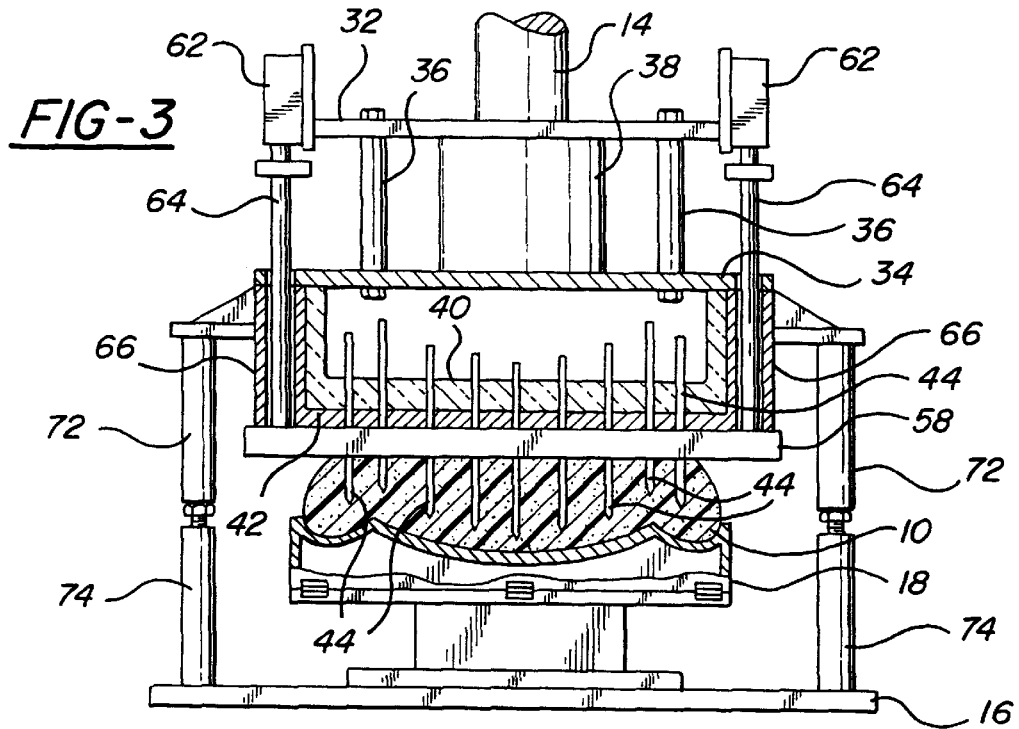
FIG. 3 is a view similar to the FIG. 2 but showing the needles piercing the cushion for picking the cushion off the tool.

The cover layer of material 22 is bonded over the undulating upper surface of the foam cushion 10 in accordance with a method comprising a varying sequence of the steps, i.e., the steps may be sequential, simultaneous, or varying in order. For example, the method illustrated in the FIG. 2 includes the step of placing the foam cushion 10 having an undulating surface on the tool 18 having the working surface 20 conforming to the undulating surface of the cushion to be covered, followed by the step illustrated in the FIG. 3 of piercing the cushion with the plurality of needles 44 to varying depths in the cushion; however, the cushion may first be placed on a remote loading station (not shown) with the entire upper ram assembly being movable to pick up the cushion at the remote loading station and move the cushion back to the tool for bonding.

As shown in the FIG. 2, the compression plate 58 is in the lowered position, as at the end of a cycle, but is raised by the actuators 62 to engage or be next adjacent to the bottom wall 42 of the plenum 34 before the cushion 10 is placed upon the tool 18. The ram 14 is sequenced to lower the plenum 34 and the needles 44 so that the needles pierce the cushion 10, as shown in the FIG. 3, i.e., disposing the compression plate 58 with the holes 60 extending therethrough on the backside of the cushion with the needles extending through the holes. Thereafter, the ram 14 lifts the plenum 34 and the needles 44 to perform the step of lifting the cushion 10 from the tool 18 as the cushion is frictionally retained on the needles. As an alternative, the compression plate 58 can be maintained in the lowered position as the ram 14 lowers the plenum 34 and then raised relative to the plenum when within about one inch of the cushion 10 to protect an operator from the needles 44.

The heater 38 performs the steps of heating compressed air to a temperature approximately 150° to 160° F. and above the temperature of the cushion 10 and supplying that hot compressed air to the needles 44. The method includes the step of ejecting the hot compressed air from the needles 44 and into the cushion 10 to elevate the temperature of the cushion, while maintaining a substantially equal mass flow rate of hot air through each of the needles. Again, these steps may be performed remotely from the tool 18 as the tool is being loaded with the cover 22 and an adhesive.

The tool 18 is loaded with the cover 22 and the adhesive by first moving or pivoting the tool from the horizontal working position beneath the needles 44 to the loading position, as shown in the FIG. 7, with the working surface 20 thereof facing generally forwardly. In this forwardly inclined position, the tool 18 is out from under the needles 44 and more accessible to the operator for loading. While in this loading position, the operator performs the step of spreading the cover 22 over the working surface 20 of the tool 18 with the finished side of the cover facing the working surface. The finished side of the cover 22 is that side which will end up being the side presented to the vehicle interior. In the case of leather, it would be the treated and smooth side; in the case of velvet, it would be the felt side. The cover 22 can be an automotive grade fabric such as that available from Milliken™ or it may be laminated with a thin layer of foam such as that available from Foamex™ or it can be a tack sewn to a thin foam sheet.

The loading step further includes placing an adhesive 82 over the backside of the cover 22. As illustrated in the FIG. 1 and the FIG. 3, the adhesive 82 comprises a thin film which is impervious to air. Preferably, the film is clear so that the operator can see through the film to remove wrinkles in the cover layer 22. Alternatively, the adhesive may comprise a paste which is spread over the backside of the cover 22. The adhesive 82 melts at the low temperature recited above to cross-link or react and is available from Worthen Industries™ and may be available in the future from Bostik™. In any case, the method continues by applying a vacuum pressure over the working surface 20 of the tool 18 to draw the cover 22 against the working surface. The vacuum is created by the vacuum source 26 and is communicated through the fluid lines 28 and 30 to a plenum below the tool 18 and to the interior chamber 24. The vacuum is applied over the working surface 20 of the tool 18 through passages or apertures in the top wall of the tool, or through pores in the tool in the case of a porous tool. In the situation where the cover 22 is permeable to air flow, the adhesive 82 is an air impervious film to react with the vacuum applied thereto to pull the cover down against the working surface 20 of the tool 18. In the situation where the cover 22 is impervious to air, as in the case of leather, the adhesive 82 may be a paste or the equivalent as the vacuum reacts directly with the impervious cover. In either case, the cover 22 is made smooth and free of wrinkles over the working surface 20 of the tool 18 by the operator while under the influence of the vacuum.

Figure 4:
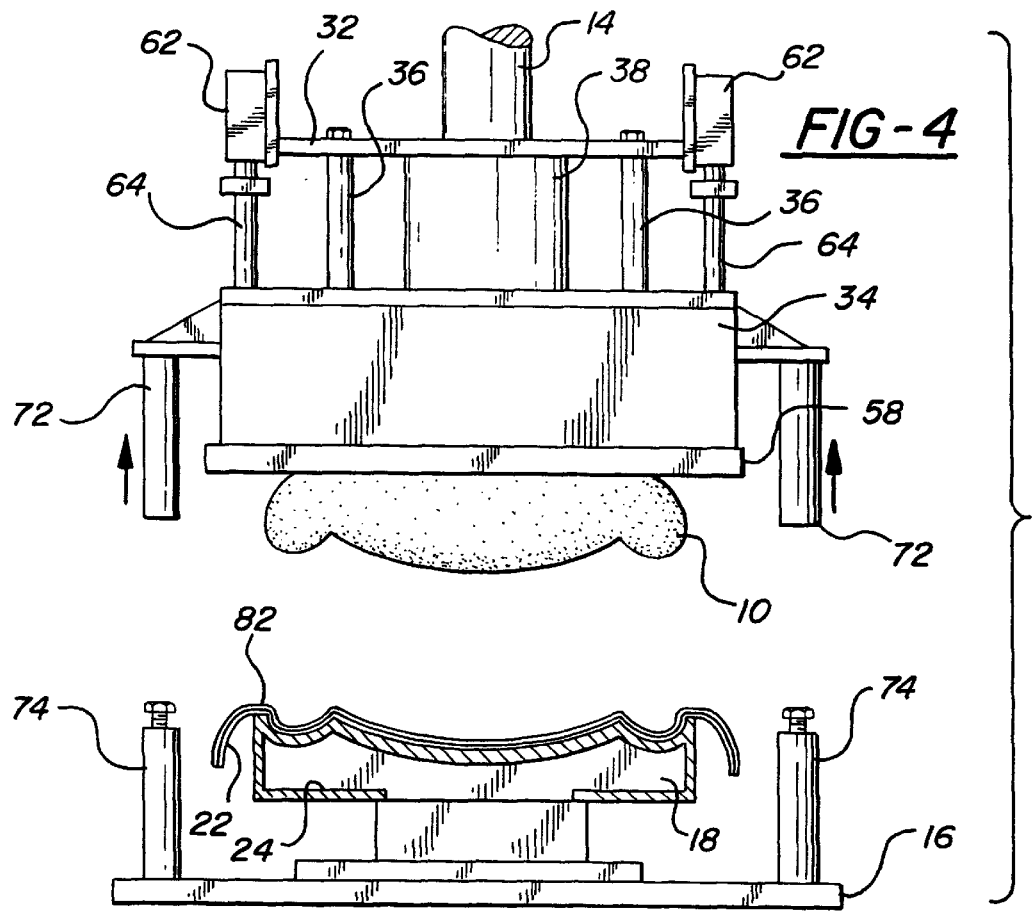
FIG. 4 is a similar view but showing the cushion suspended in space above the tool and the tool loaded with a layer of cover material and a layer of adhesive.

Once the tool 18 is loaded with the cover 22 and the adhesive 82, the process continues by lowering the tool to the working position, as shown in the FIG. 4. The tool 18, or the entire base 16, is raised and lowered by actuation of the actuator 80 shown in the FIG. 7.

Figure 5:
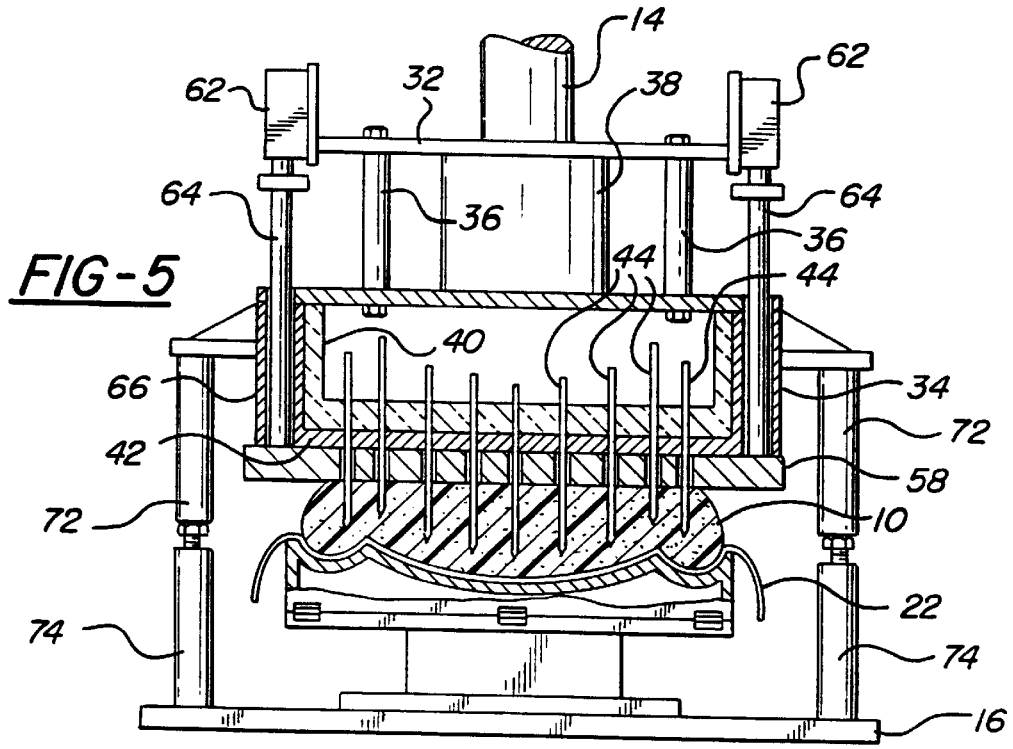
FIG. 5 is a similar view but showing the heated cushion against the cover with the adhesive having been melted and diffused thereinto.

The method is characterized by preheating the cushion 10 to elevate the temperature of the cushion and thereafter moving the surface of the heated cushion to be covered against the adhesive 82 and the backside of the cover 22 to melt the adhesive with the transfer of heat from the heated cushion. This is accomplished by lowering the needles 44 with the cushion 10 thereon from the position shown in the FIG. 4 to the position shown in the FIG. 5 to place the undulating surface of the cushion against the adhesive 82 and the backside of the cover 22. This lowering is performed by the ram 14 and the stops 72, 74 and 76 are adjusted for preventing the needles 44 from contacting the tool working surface 20. The hot air has preheated the cushion 10 sufficiently to cause the melting of the adhesive 82 with the transfer of heat from the cushion. In fact, the cushion 10 is hot enough relative to the melting point of the adhesive 82 to cause the adhesive to melt in a very short time, that is, a short enough time period to prevent a quantity of heat transfer to the finished side of the cover 22 sufficient to cause degradation of the cover.

Relatively quickly, therefore, the ram 14 is actuated to perform the step of extracting the needles 44 from the cushion 10, the step shown in the FIG. 6. During this step the actuators 62 assure the holding of the compression plate 58 against the backside of the cushion 10 to hold the undulating surface of the cushion against the cover 22 and the tool 18 as the needles 44 are extracted. The cooler 70 continually operates for cooling ambient air to provide cool or cold air so that immediately upon the hot needles 44 being extracted from the cushion 10, cold air is ejected from the passages 68 in the compression plate 58 and into the cushion from the backside thereof to cure the adhesive 82 and bond the cover 22 to the cushion. Thereafter, the ram 14 is raised back to the position shown in the FIG. 1 and the cushion 10 with the cover 22 bonded thereto is removed from the tool 18. However, the cooler 70 can be eliminated for the cushions 10 in which the thickness renders such cooling ineffective.

As shown in the FIG. 1, the assembly includes a control panel 84 for sequencing the various steps. The control panel 84 may be utilized to manually sequence the steps by manual manipulation to perform each step as by pushing a button to execute the actuation of each of the ram 14, the actuators 62 and 80, the heater 38, the vacuum source 26, the cooler 70, etc. Alternatively, the controller 84 may be fully automatic to perform the steps in the desired sequence.

The cover layer of material 22 can be bonded over the undulating upper surface of the foam cushion 10 in accordance with an alternate method comprising a variation on the sequence of the steps described above. According to the alternate method, the tool 18 is first loaded with the cover 22 and the adhesive 82 by moving or pivoting the tool from the horizontal working position beneath the needles 44 to the loading position, as shown in the FIG. 7, with the working surface 20 thereof facing generally forwardly. While in this loading position, the operator spreads the cover 22 over the working surface 20 of the tool 18 with the finished side of the cover facing the working surface. The operator then places the adhesive 82 over the backside of the cover 22 and applies the vacuum pressure over the working surface 20 of the tool 18 to draw the cover against the working surface and make the cover smooth and free of wrinkles over the working surface. Once the tool 18 is loaded with the cover 22 and the adhesive 82, the process continues by moving the tool to the working position, as shown in the FIG. 2, although the cushion 10 is not yet present.

Next, the operator places the cushion 10 on the working surface 20, as shown in the FIG. 2, on top of the cover 22 and the adhesive 82 which were previously positioned on the tool 18. Then, the compression plate 58 is lowered to a compression position 59, as illustrated in the FIG. 6, to compress the cushion 10 and force ambient temperature air from the interior thereof. The plenum 32 is lowered piercing the cushion 10 with the plurality of needles 44 and the compression plate 58 is raised enough to release the compression, as illustrated in the FIG. 5, but maintain contact with the backside of the cushion. The forcing of the ambient temperature air from the interior of the cushion 10 makes it easier to eject the hot air from the needles 44 and into the cushion interior to elevate the temperature of the cushion, while maintaining a substantially equal mass flow rate of hot air through each of the needles. The cushion 10 is hot enough relative to the melting point of the adhesive 82 to cause the adhesive to melt in a very short time, that is, a short enough time period to prevent a quantity of heat transfer to the finished side of the cover 22 sufficient to cause degradation of the cover.

Once again, the compression plate 58 is lowered to the compression position 59 to compress and thereby force the hot air from the interior of the cushion 10. At the same time, the vacuum source 26 can be connected to the plenum 34 by a line 31 (FIG. 1) to pull the hot air from the cushion 10 through the needles 44. The ram 14 is actuated to perform the step of extracting the needles 44 from the cushion 10, as shown in the FIG. 6. The plenum 34 and the compression plate 58 are raised to the positions shown in the FIG. 2 and the tool 18 can be tilted to remove the cushion 10 with the cover 22 bonded thereto. This alternate method has the advantage of not requiring any cooling air.

The needles 44 can be approximately 0.125" in outside diameter and an exterior surface thereof can be coated with a friction reducing material such as a synthetic resin polymer sold under the trademark TEFLON to a thickness of approximately 0.010" to prevent damage to the cells in the foam cushion 10. As shown in the FIG. 8, the needle 44 has a plurality of ports 54 formed therein such as paired upper and lower ports which represent four pairs of such ports equally spaced about the needle. In the alternative, each pair of the ports 54 can be replaced by a single larger diameter port (providing the same mass flow) spaced approximately 0.040" above the start of the taper on the pointed end 56. The temperature of the heated air as it exits the ports 54 should be between 170° F. and 200° F. at a pressure of 2.5 to 10 psig at the inlet to the needle 44. Generally, the needles are positioned on approximately 2" centers to provide a mass flow rate of 0.5 to 2.5 cubic feet per minute.

In summary, the method of bonding the cover layer of material 22 over the surface of the foam cushion 10 according to the present invention comprises the steps of: moving the tool 18 from the working position beneath the plurality of needles 44 to the loading position with the working surface 20 of the tool facing generally forwardly; spreading the finished side of the cover over the working surface of the tool; placing the adhesive 82 on a backside of the cover; applying the vacuum pressure over the working surface of the tool to draw the cover against the working surface of the tool; moving the tool from the loading position to the working position; placing the foam cushion on the working surface of the tool with a surface to be bonded to the cover on the adhesive; disposing the compression plate 58 with the holes 60 extending therethrough on the backside of the cushion to compress the cushion and force air from the interior of the cushion; piercing the cushion with the plurality of needles extending through the holes in the compression plate to varying depths in the cushion; lifting the compression plate to remove the compression from the cushion; injecting heated air into the interior of the cushion through the needles to elevate the temperature of the cushion thereby melting the adhesive with the transfer of heat from the heated cushion; lowering the compression plate to compress the cushion and force the heated air from the interior of the cushion thereby cooling the cushion to cure the adhesive to thereby bond the cover to the cushion; lifting the compression plate to remove the compression from the cushion to allow ambient temperature air to flow into the interior of the cushion to cure the adhesive; and extracting the needles from the cushion while holding the compression plate against the backside of the cushion to hold the bonded cushion and cover against the tool as the needles are extracted. The method further includes the step of heating ambient air to a temperature above the temperature of the cushion and supplying the heated air to the needles, and the of applying a vacuum pressure to the needles to draw the heated air from the interior of the cushion thereby cooling the cushion to cure the adhesive to thereby bond the cover to the cushion.

The apparatus according to the present invention comprises: the support structure 12; the tool 18 supported by the support structure and having the working surface 20; the vacuum source 26 connected to the tool for applying vacuum pressure over the working surface of the tool to draw the cover 22 against the working surface; the array of needles 44 movably supported by the support structure for piercing the foam cushion 10 placed on the working surface; the compression plate 58 having the holes 60 extending therethrough for receiving the needles extending through the holes, the compression plate being movably supported by the support structure for movement relative to the needles; and the plenum chamber 34 having the wall 42, the needles extending through the wall and having bores 52 therein for conveying heated compressed air from the plenum to the ejection ports 54 in the needles for heating the interior of the cushion pierced by the needles, the vacuum source being connected to the plenum for subsequently drawing the heated air from the interior of the cushion.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of bonding a cover layer of material over a surface of a foam cushion comprising the steps of:
   a. spreading a finished side of a cover over a working surface of a tool;
   b. placing an adhesive on a backside of the cover;
   c. placing a foam cushion on the working surface of the tool;
   d. compressing the cushion to force air from an interior of the cushion;
   e. removing the compression from the cushion; and
   f. injecting heated air into the interior of the cushion to elevate a temperature of the cushion thereby melting the adhesive with the transfer of heat from the heated cushion to thereby bond the cover to the cushion.

2. The method according to claim 1 wherein said step e. includes piercing the cushion with a plurality of needles and ejecting the heated air from the needles and into the surrounding cushion to elevate the temperature of the cushion.

3. The method according to claim 2 wherein said step d. includes disposing a compression plate with holes extending therethrough on a backside of the cushion and holding the compression plate against the backside of the cushion to compress the cushion against the cover and the tool and said step e. includes extending the needles through the holes in the compression plate.

4. The method according to claim 1 including a further step g. of compressing the cushion to force the heated air from the interior of the cushion thereby cooling the cushion to cure the adhesive to thereby bond the cover to the cushion.

5. The method according to claim 4 wherein said step g. includes applying a vacuum pressure to the needles to draw the heated air from the interior of the cushion thereby cooling the cushion to cure the adhesive to thereby bond the cover to the cushion.

6. The method according to claim 2 wherein said step f. includes maintaining a substantially equal mass flow rate of the heated air through each of the needles.

7. The method according to claim 1 including applying a vacuum pressure over the working surface of the tool to draw the cover against the working surface of the tool prior to performing said step c.

8. A method of bonding a cover layer of material over the surface of a foam cushion comprising the steps of:
   a. moving a tool from a working position beneath a plurality of needles to a loading position with a working surface of the tool facing generally forwardly;
   b. spreading a finished side of a cover over the working surface of the tool;
   c. placing an adhesive on a backside of the cover;
   d. applying a vacuum pressure over the working surface of the tool to draw the cover against the working surface of the tool;
   e. moving the tool from the loading position to the working position;
   f. placing a foam cushion on the working surface of the tool with a surface to be bonded to the cover on the adhesive;
   g. disposing a compression plate with holes extending therethrough on a backside of the cushion to compress the cushion and force air from an interior of the cushion;
   h. piercing the cushion with a plurality of needles extending through the holes in the compression plate to varying depths in the cushion;
   i. lifting the compression plate to remove the compression from the cushion;
   j. injecting heated air into the interior of the cushion through the needles to elevate a temperature of the cushion thereby melting the adhesive with the transfer of heat from the heated cushion;
   k. lowering the compression plate to compress the cushion and force the heated air from the interior of the cushion thereby cooling the cushion to cure the adhesive to thereby bond the cover to the cushion;
   l. lifting the compression plate to remove the compression from the cushion to allow ambient temperature air to flow into the interior of the cushion to cure the adhesive; and
   m. extracting the needles from the cushion while holding the compression plate against the backside of the cushion to hold the bonded cushion and cover against the tool as the needles are extracted.

9. The method according to claim 8 wherein after said step j. applying a vacuum pressure to the needles to draw the heated air from the interior of the cushion thereby cooling the cushion to cure the adhesive to thereby bond the cover to the cushion.

10. The method according to claim 8 including a step of heating compressed air to a temperature above the temperature of the cushion and supplying the heated compressed air to the needles.

11. An apparatus for bonding a cover of material to a surface of a foam cushion with an adhesive comprising:
   a support structure;
   a tool supported by said support structure and having a working surface;
   a vacuum source connected to said tool for applying vacuum pressure over said working surface of said tool to draw a cover against said working surface;
   an array of needles movably supported by said support structure for piercing a foam cushion placed on said working surface;
   a compression plate having holes extending therethrough for receiving said needles extending through said holes, said compression plate being movably supported by said support structure for movement relative to said needles; and
   a plenum chamber having a wall, said needles extending through said wall and having bores therein for conveying heated air from said plenum to ejection ports in said needles for heating an interior of a cushion pierced by said needles, said vacuum source being connected to said plenum for subsequently drawing the heated air from the interior of the cushion.

* * * * *